(12) United States Patent
Terry

(10) Patent No.: US 8,375,418 B2
(45) Date of Patent: *Feb. 12, 2013

(54) METHOD OF PERFORMING SOFTWARE UPDATES (INSTALLATIONS), ON NETWORKED 32/64-BIT MICROSOFT COMPUTERS IN AN AUTOMATED ENVIRONMENT WITHOUT INTRODUCING A POSSIBLE SECURITY THREAT

(75) Inventor: Robert F. Terry, Old Hickory, TN (US)

(73) Assignee: CW International, LLC, Ellwood City, PA (US)

( * ) Notice: Subject to any disclaimer, the term of this patent is extended or adjusted under 35 U.S.C. 154(b) by 597 days.

This patent is subject to a terminal disclaimer.

(21) Appl. No.: 12/440,326

(22) PCT Filed: Sep. 7, 2007

(86) PCT No.: PCT/US2007/077945
§ 371 (c)(1),
(2), (4) Date: Apr. 26, 2010

(87) PCT Pub. No.: WO2008/031078
PCT Pub. Date: Mar. 13, 2008

(65) Prior Publication Data
US 2010/0205650 A1    Aug. 12, 2010

Related U.S. Application Data

(60) Provisional application No. 60/824,823, filed on Sep. 7, 2006.

(51) Int. Cl.
*G06F 17/00* (2006.01)
*H04L 9/00* (2006.01)
(52) U.S. Cl. ............. 726/1; 726/2; 726/3; 726/4; 726/5; 713/164; 713/165; 713/166; 713/167
(58) Field of Classification Search ................. 726/1
See application file for complete search history.

(56) References Cited

U.S. PATENT DOCUMENTS

| 7,293,272 B1 * | 11/2007 | Okcu et al. ............... 719/327 |
| 2004/0123153 A1 | 6/2004 | Wright et al. |
| 2005/0262076 A1 * | 11/2005 | Voskuil ...................... 707/8 |
| 2006/0005263 A1 | 1/2006 | Hardt |

OTHER PUBLICATIONS

International Application No. PCT/US07/77945—International Search Report and Written Opinion of the International Searching Authority mailed Jun. 17, 2008.

* cited by examiner

*Primary Examiner* — Longbit Chai
(74) *Attorney, Agent, or Firm* — Miles & Stockbridge P.C.; David R. Schaffer, Esq.

(57) ABSTRACT

A method of monitoring all network communications, including a real-time analysis of intercepting all networked connections and closing those network connections, including all connections across the Internet, except for those specific connections that will function to update a networked computer with new software or updates to existing software.

33 Claims, 8 Drawing Sheets

METHOD OF PERFORMING SOFTWARE UPDATES (INSTALLATIONS), ON NETWORKED 32/64-BIT MICROSOFT COMPUTERS IN AN AUTOMATED ENVIRONMENT WITHOUT INTRODUCING A POSSIBLE SECURITY THREAT

This application claims benefit of priority to U.S. Provisional Patent Application No. 60/824,823, filed Sep. 7, 2006, which is herein incorporated in its entirety by reference.

FIELD OF INVENTION

1. Field of Invention

This method of invention relates generally to the field of network utility professional programming, and more particularly but not exclusively, to monitoring network communication connections, methods of intercepting network communications connections and closing all networked connections, except those connections that function to update a networked computer with new software or updated software.

2. Background of Invention

As networking and automation expands in business and organizations, one of the most important new technical capabilities in today's modern network computing, is the ability for organizations to automatically install new software, or automatically update existing software across a network. In essence, organizations have the capability to allow "connectivity" from their Local Area Network, (LAN), to the Internet and any other public network (organization), which in turn can update that particular network with new software, or updates to the current software installed within the network. For example, it is very common for an anti-virus vendor to update individual PCs attached to a network via the Internet with new file signature data more than once during any given 24 hour period. Another example is the use of network management tools, which have the ability to automatically update large networks (i.e., wide area networks—WANs), with any kind of software, from small individual programs to a major operating system (O/S) service pack update.

Another issue, is that a 32/64-bit Microsoft computer automatically creates hidden "administrative shares" for its logical drives C:, D:, etc., which it names C$, D$, etc., respectively. The 32/64-bit Microsoft computer also creates an Admin$ hidden share for the \WINNT or \Windows folder. Domain administrators design these shares for remote access support. By default, if these administrative shares are deleted, they are automatically recreated when the computer is rebooted. These active "administrative shares" allow any individual user, to remotely log into a 32/64-bit Microsoft computer, if the remote user knows the system name and password of that particular computer. Other shares may also be of issue, including, but not limited to, an ipc$ share, which is a network share that is used to facilitate communication between processes and computers. This share is often used to exchange authentication data between computers.

The biggest issue with the majority of the network management tools available to perform automatic network updates is that they require their solutions be applied in the form of configuration "absolutes", that is, "one size fits all," without any consideration for how the networked computer should function when it is not receiving automatic authorized software updates, but operating in a normal production environment. As an example, many networked solutions require that an "administrative share" be configured into each networked computer, to allow the network management tool that resides on a remote computer, to access and update each networked computer anytime the network is operational. If the "administrative share" is configured and active during the entire time each networked computer is turned on, then this "administrative share" allows an individual user, who is connected via a network computer and is probing the network with various tools, to possibly obtain an authorized system name and password to a networked computer and then remotely login to the networked computer (i.e., a successful unauthorized security penetration of the networked computer).

Because of the problems described in the previous paragraphs, a new technology (such as, for example, a utility) is needed that has the ability to allow network management tool(s) to securely perform automated software updates on, a networked computer, for example, a 32/64-bit Microsoft PC or Server. In addition, the utility should also insure the security of the networked computer during the time of the automated software updates and during those periods that the networked computer is not receiving any automated software updates from the network management tool(s).

SUMMARY

In accordance with an embodiment of the present invention, a method includes executing and performing an analysis of a networked 32/64-bit Microsoft computer's, for example, a 32/64-bit Microsoft PC's and/or server's, internal communications configuration, and then configuring the computer to allow network management tool(s) to perform automated software updates on the networked 32/64-bit Microsoft PC and/or Server, while also insuring the security of the networked computer during the time of the automated software updates and during those periods that the networked computer is not receiving any automated software updates from the network management tool(s).

BRIEF DESCRIPTION OF DRAWINGS

Non-limiting and non-exhaustive embodiments of the present invention are described with reference to the following figures, wherein like reference numerals refer to like parts throughout the various views unless otherwise precisely specified.

DETAILED DESCRIPTION OF ILLUSTRATED EMBODIMENTS

In the description herein, general details are provided in flow diagrams, to provide a general understanding of the programming methods that will assist in an understanding of embodiments of the inventive methods. One skilled in the relevant art of programming will recognize, however, that the invention method can be practiced without one or more specific details, or in other programming methods. Terms referenced throughout this specification to "one embodiment" or "an embodiment" means that a particular feature, structure or characteristic described in connection with the embodiment is included in at least one embodiment of the present inventive method. Thus, the appearance of the phrases "in one embodiment" or "in an embodiment" in places throughout this specification are not necessarily all referring to the same embodiment. Furthermore, the particular features, structures, or characteristics may be combined in any suitable manner in one or more embodiments.

As an overview, the ability for a programmer to design and develop an operating system (O/S) utility may be based on the capabilities of the O/S NetAPI functions, Winsock and those functions that allow an interface to gather information critical to files that reside within the O/S Winsock. In accordance with one or more embodiments of the present invention, the O/S utility may be developed or implemented in a variety of programming languages ranging from low-level, programming languages (e.g., but not limited to, assembler) to high-level programming languages (e.g., but not limited to, C++, Visual Basic, Java, Java Beans, etc.). The O/S utility may be stored or encoded as an executable file on a machine-readable and/or a computer-readable medium (e.g., but not limited to, a floppy disk, a hard drive, a flash drive, a bubble memory, a Read Only Memory (ROM), a Random Access Memory (RAM), or the like) and/or hardwired into one or more integrated circuits (e.g., an Electrically Erasable Programmable Read Only Memory (EEPROM), an Erasable Programmable Read Only Memory (EPROM), etc.).

In accordance with one or more embodiments of the present invention, the O/S utility may be developed or implemented in a variety of programming languages ranging from low-level, programming languages (e.g., but not limited to, assembler) to high-level programming languages (e.g., but not limited to, C++, Visual Basic, Java, Java Beans, etc.). The O/S utility may be stored or encoded as an executable file on a machine-readable and/or a computer-readable medium (e.g., but not limited to, a floppy disk, a hard drive, a flash drive, a bubble memory, a Read Only Memory (ROM), a Random Access Memory (RAM), or the like) and/or hardwired into one or more integrated circuits (e.g., an Electrically Erasable Programmable Read Only Memory (EEPROM), an Erasable Programmable Read Only Memory (EPROM), etc.).

Figure 1:
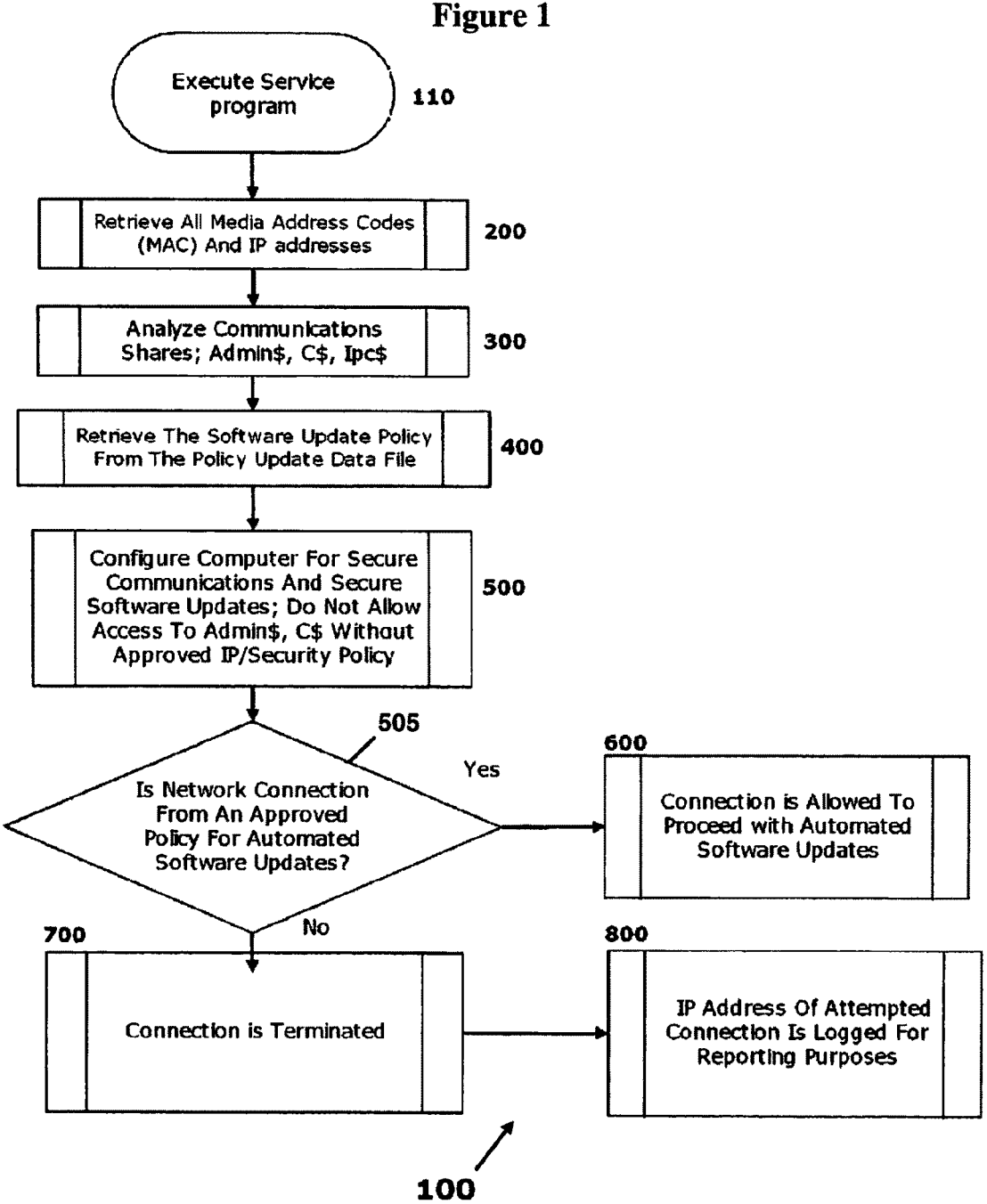
FIG. 1 is a general flow diagram of a method that can be performed after the communications configuration and connection policies are applied to the computer and how the computer performs a real-time analysis on all connections and determines if those connections or authorized or unauthorized, in accordance with at least one embodiment of the present invention.

FIG. 1 is a general flow diagram of a method that can be performed after the communications configuration and connection policies are applied to the computer and illustrating how the computer can perform a real-time analysis on all connections and determine if those connections or authorized or unauthorized, in accordance with at least one embodiment of the present invention. In FIG. 1, there is shown a detailed flow diagram of an O/S utility program executing (110) as a service from the time the computer is powered-on (i.e., booted-up) and retrieving (200) Media Access Codes (MAC) and IP addresses from the computer and performing a basic analysis of the communications configuration of the computer, analyzing (300) and securing the network shares, and reading (i.e., retrieving) (400) the TCP software update policy. After the TCP software update policy has been retrieved, the TCP software update policy may be applied to configure (500) the computer for secure communications by applying the retrieved connections policies to enable determining (505) whether all attempted connections in a real-time environment are allowable. If the attempted connection is determined (505) to be within the approved software update policy, the connection may be allowed to proceed (600). However, if the connection is determined (505) not to be within the approved software update policy parameters, the connection may be terminated (700) and the IP address of the attempted connection is logged (800) for reporting purposes.

Figure 2:
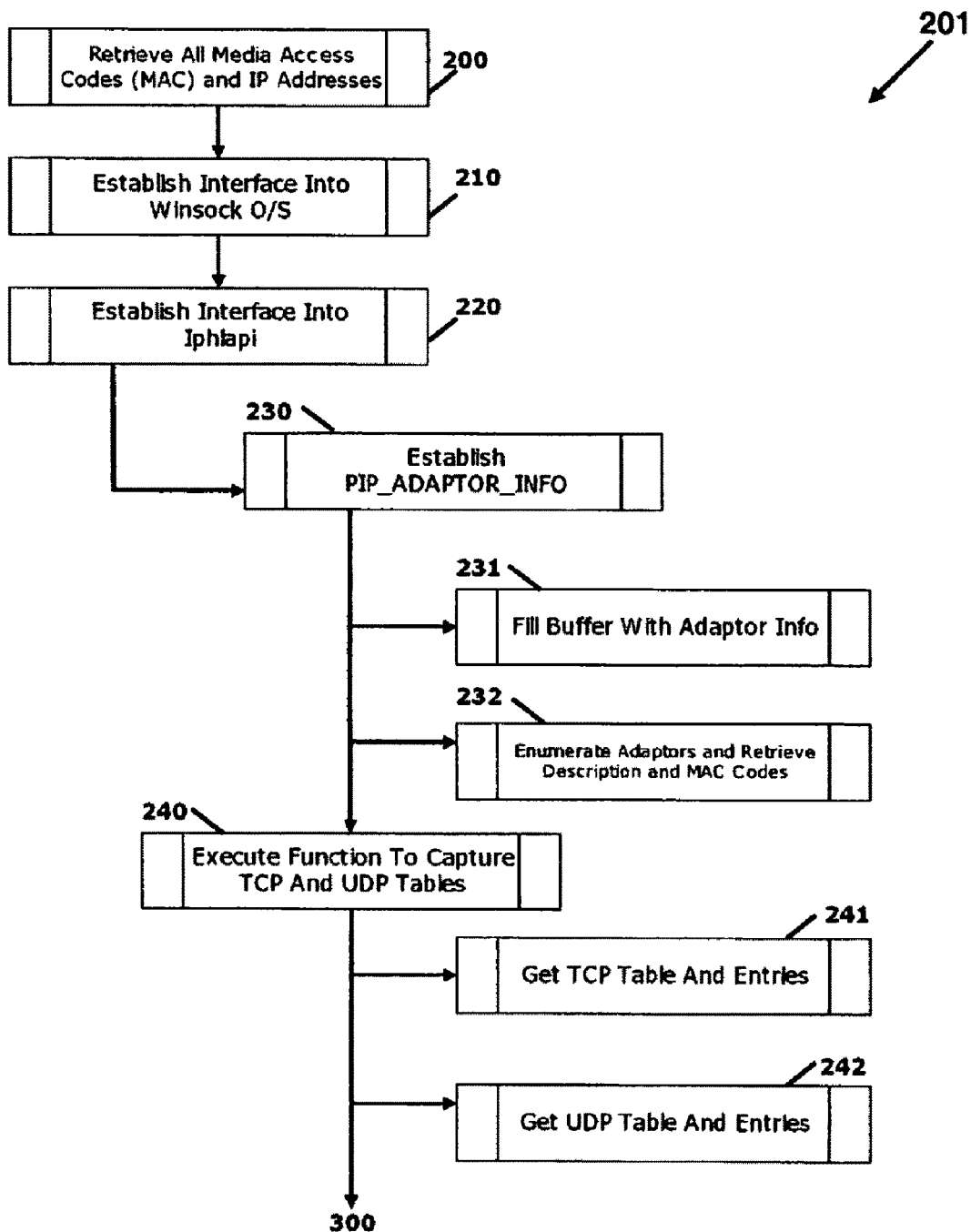
FIG. 2 is a detailed flow diagram of a method for establishing an interlink into the operating system Winsock and Iphlapi (i.e., operating system APIs) to capture the Transmission Control Protocol (TCP) and User Datagram Protocol (UDP) Table entries, in accordance with at least one embodiment of the present invention.

FIG. 2 is a detailed flow diagram of a method 201 for establishing an interlink into the operating system Winsock and Iphlapi (i.e., operating system APIs) to capture the Transmission Control Protocol (TCP) and User Datagram Protocol (UDP) Table entries, in accordance with at least one embodiment of the present invention. In FIG. 2, there is shown a detailed flow diagram of the service program retrieving (200) all MAC codes and IP addresses and performing an analysis function of the communications configuration of the computer by initially establishing (210) an interlink/interface into the operating system Winsock and establishing (220) an interlink/interface into the operating system Iphlapi (O/S API). Once the interfaces/interlinks into the Winsock and Iphlapi are established (210, 220, respectively), the next function may then establish (230) a PIP_ADAPTER_INFO Table and fill (231) a buffer with adapter information. The function may then traverse (i.e., enumerate) (232) the adapter table to record all MAC codes utilized by the computer. A function may then execute (240) to capture the TCP and UDP tables using a get (241). After the TCP table and its entries are obtained (241) and the UDP table and its entries are obtained (242), the TCP and UDP tables are stored in a memory in the computer, and the service program may continue on to analyze (300) the network shares.

Figure 3:
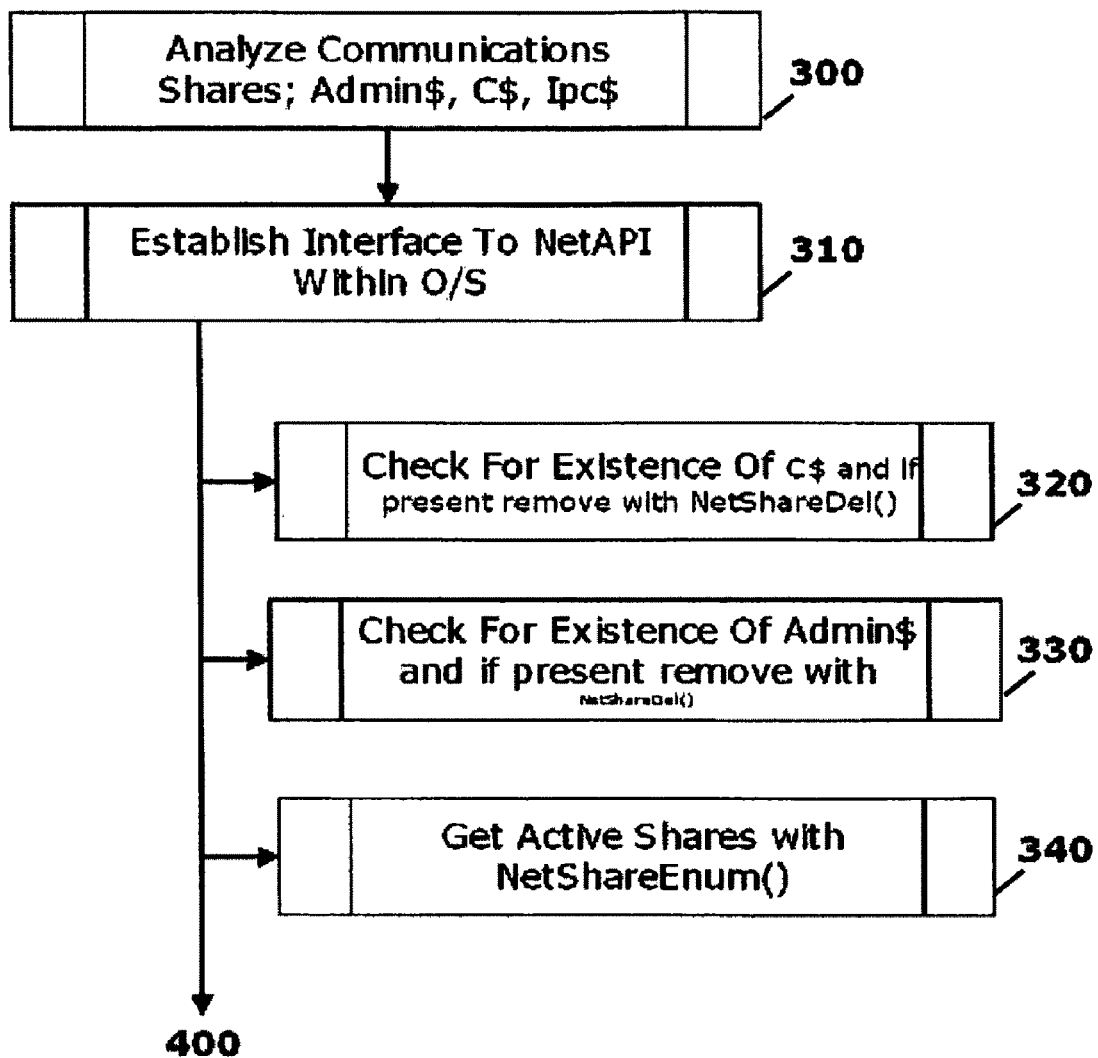
FIG. 3 is a detailed flow diagram of a method for establishing an interlink into the NetAPI (operating system API) to check for the existence of specific network shares and retrieving all remaining active network shares, in accordance with at least one embodiment of the present invention.

FIG. 3 is a detailed flow diagram of a method 301 for establishing an interlink into the NetAPI (operating system API) to check for the existence of specific network shares and retrieving all remaining active network shares, in accordance with at least one embodiment of the present invention. In FIG. 3, there is a shown a detailed flow diagram of the service program initiating a function to analyze (300) and capture network communications shares (i.e., network shares). Capturing the active network communications shares may include establishing (310) an interlink/interface into the operating system NetApi (O/S API), then executing (320) a function specifically to check for the existence of network share C$ and executing (330) a function specifically to check for the existence of network share Admin$ and, if these shares are present, to delete (i.e., remove) these shares with a NetShareDel( ) function to prevent a possible security threat from C$ and Admin$ shares. Finally, the service program captures (340) all remaining active shares by executing a NetShareEnum( ) function and recording this information into a data file and then continuing to the reading (400) of the TCP connection policies function.

Referring back to FIG. 1, there is shown the retrieving (400) all communications connection policies (i.e., TCP connection policies), which specifically are retrieved by executing a fopen( ) function, a fread( ) function, and decrypted by establishing an interlink/interface into an operating system crypto API. When the policy data file is decrypted, it is applied to the functions that initiate extended parallel threads to monitor all formal TCP connections to determine (505) whether each network connection is from an approved connection from the private access network. For example, the software update policy defines a specific IP address, such as the following: Allow Software Updates (Installations)—example 100.200.100.101.

Figure 4:
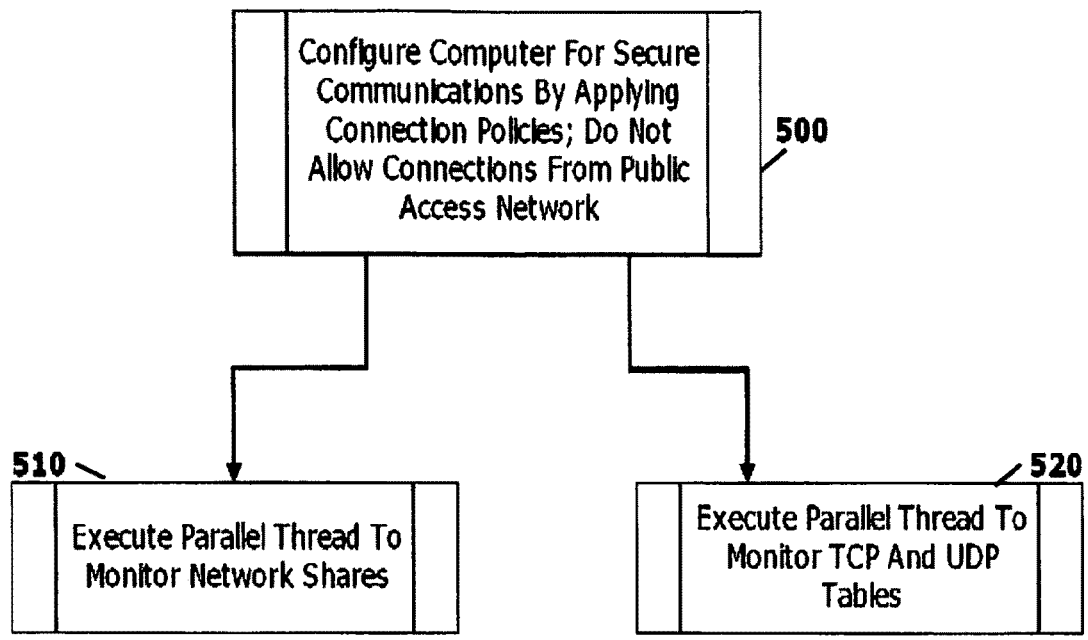
FIG. 4 is a detailed flow diagram of a method that can be performed after the initial installation and analysis of the computer to start parallel threads to monitor all TCP/UDP tables (activity) and active network shares, in accordance with at least one embodiment of the present invention.

FIG. 4 is a detailed flow diagram of a method that can be performed after the initial installation and analysis of the computer to start parallel threads to monitor all TCP/UDP tables (activity) and active network shares, in accordance with at least one embodiment of the present invention. In FIG. 4, there is shown a detailed flow diagram of the service program method after configuring (500) and securing the communications configuration (i.e., environment), including starting two external parallel threads to continuously cycle and monitor the communications activity. Specifically, a first parallel thread may be executed (510) to monitor network shares and a second parallel thread may be executed (520) to monitor all TCP and UDP communications.

Figure 5:
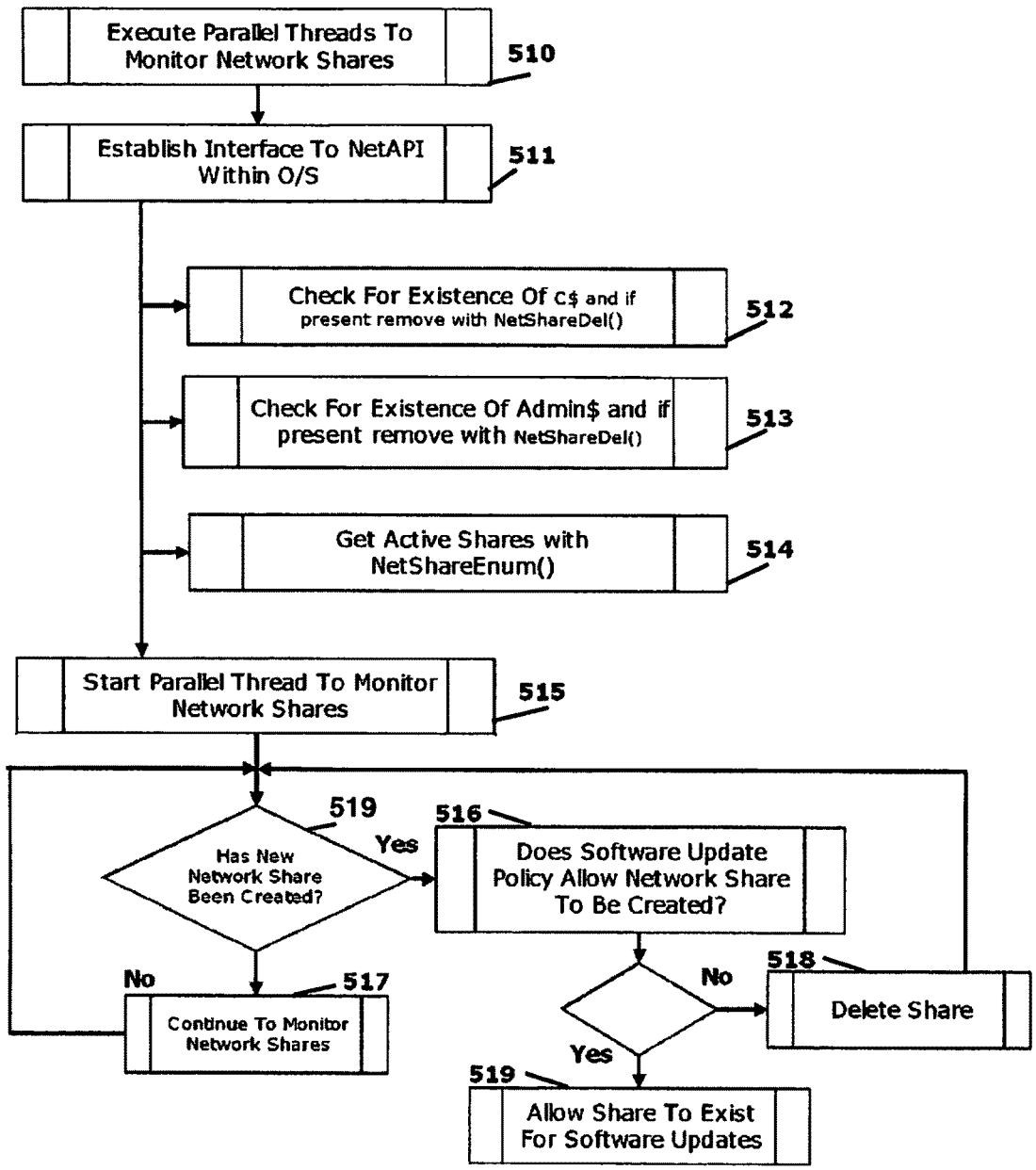
FIG. 5 is a detailed flow diagram of a method that can be performed after the initial installation and analysis of the computer to start parallel threads to monitor all active network shares, in accordance with at least one embodiment of the present invention.

FIG. 5 is a detailed flow diagram of a method that can be performed after the initial installation and analysis of the computer to start parallel threads to monitor all active network shares, in accordance with at least one embodiment of the present invention. In FIG. 5, details of the service program method starting (i.e., executing) (510) the external parallel thread to monitor and secure all network share(s) activity are shown. In particular, the parallel thread may establish (511) an interlink/interface into the NetAPI operating system API, then check (512, 513, respectively) for the existence of network share C$ and network share Admin$ and, if present, delete these shares with a NetShareDel( ) function, then retrieve (514) the remaining active shares by executing a NetSharesEnum( ) function. Once these steps are completed, the parallel thread may then execute (515) its polling cycle to continuously monitor network share activity. During the continuous monitoring, if a network share is determined (519) to have been dynamically created, the internal IP software policy may be checked (516) to verify that the connection from the connecting computer is allowed. If it is determined that the connecting computer (i.e., its IP Address) is authorized by the software updates policy, the network share may be allowed (519) to exist. If the connecting computer (i.e., its IP address) is not authorized by the software updates policy, the network share may be automatically deleted (518) network share is automatically deleted (516). Conversely, if it is determined that no network share has been created, the parallel thread may loop back to continue to monitor (517) the configuration state of the computer's network shares.

Figure 6:
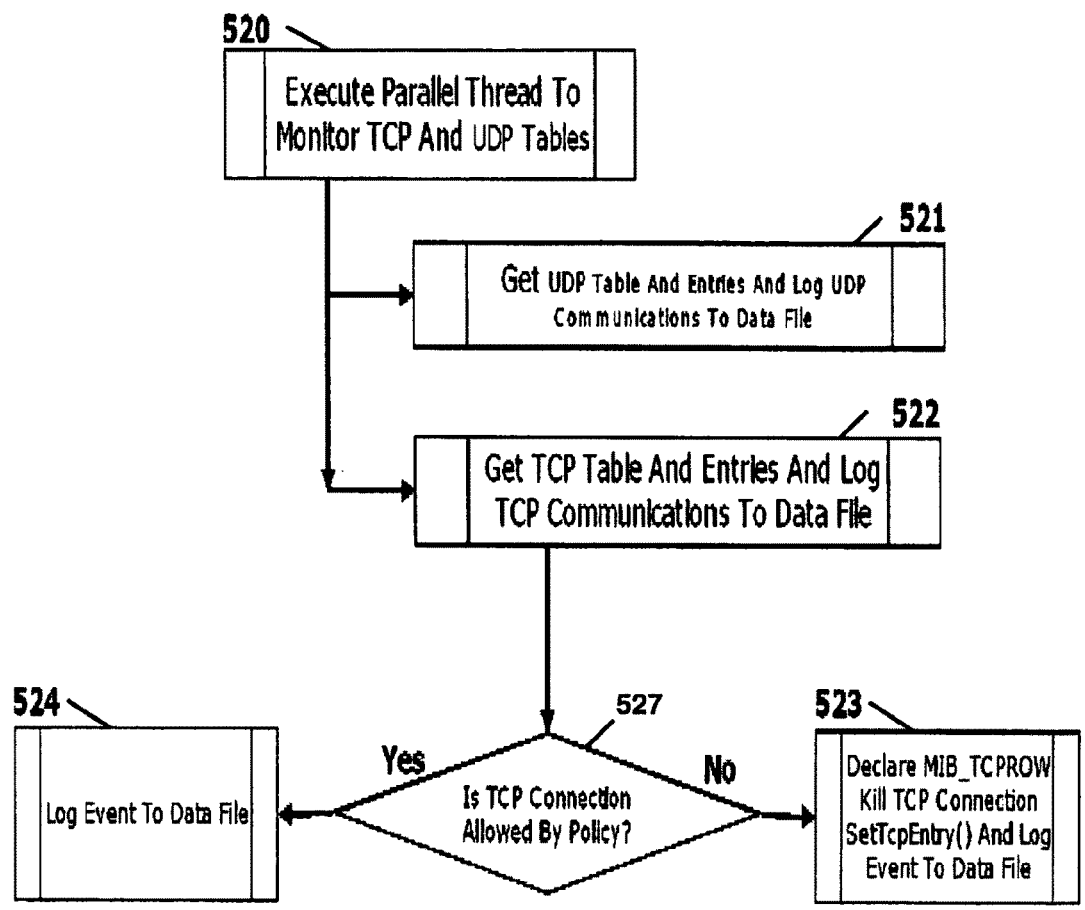
FIG. 6 is a detailed flow diagram of a method of monitoring the active TCP and UDP tables (connections) and determining if those connections are within policy (allowed) or not within policy (disallowed) and to be automatically disconnected, in accordance with at least one embodiment of the present invention.

FIG. 6 is a detailed flow diagram of a method of monitoring the active TCP and UDP tables (connections) and determining if those connections are within policy (allowed) or not within policy (disallowed) and to be automatically disconnected, in accordance with at least one embodiment of the present invention. In FIG. 6, there is shown a detailed flow diagram of the service program method starting (i.e., executing) (520) an external parallel thread to monitor and secure all TCP communications only for authorized software updates. The external parallel thread may retrieve (521) the UDP table and log the UDP communications to a data file, then retrieve (522) the TCP table and log the TCP communications to a data file, which may or may not be the same as the data file in which the UDP communications are logged. The external parallel thread may then cycle all active TCP and UDP connections and compare the connections to the IP policies defined as an authorized software update connection to determine whether the connections are allowed. If a TCP connection is determined to have an approved IP software update policy, (i.e., within the established IP specific (or range) policy), the connection may be allowed to proceed and the event logged (524) into a data file, which may or may not be the same as the data file in which the UDP and/or TCP communications are logged. If the TCP connection is determined not to be an authorized by the approved IP software update policy, the TCP connection may be terminated (523) and the event logged into a data file, which may or may not be the same as the data file in which the UDP and/or TCP communications and/or allowed events are logged.

Figure 7:
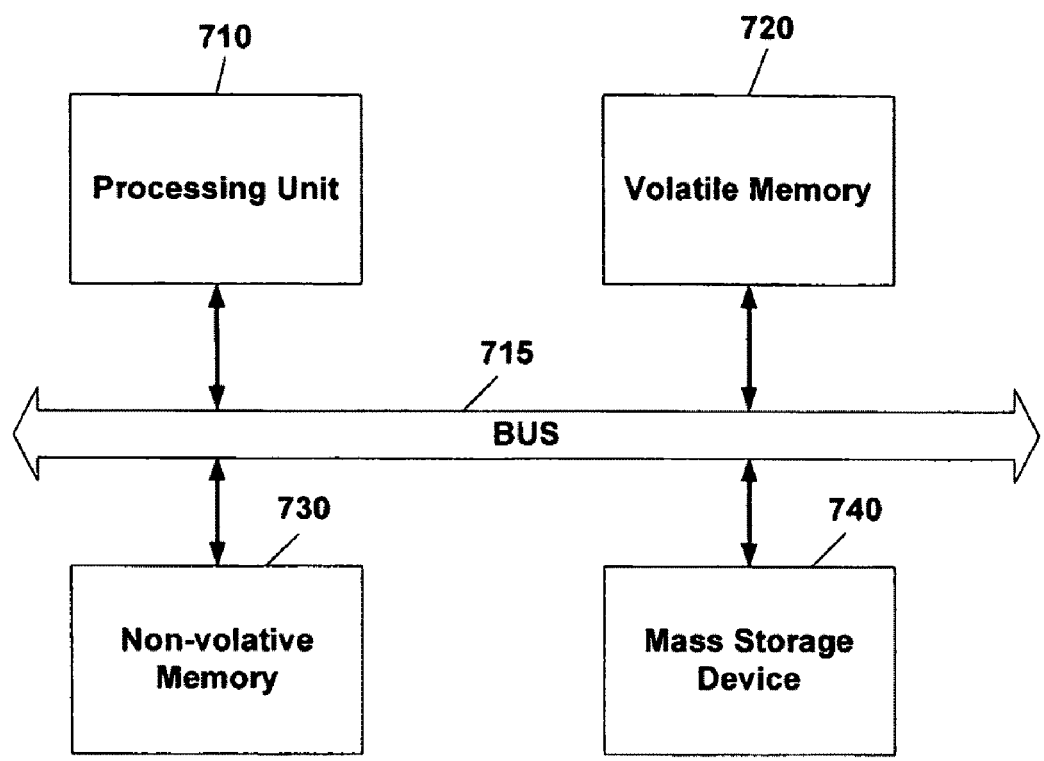
FIG. 7 is a block diagram of a computer system that may be used in accordance with at least one embodiment of the present invention.

FIG. 7 is a block diagram of a computer system that may be used in accordance with at least one embodiment of the present invention. In FIG. 7, a computer system 700 may include, but is not limited to, a processing unit (e.g., a processor) 710 connected to a bus 715 to enable processing unit 710 to have two-way communication across bus 715. Computer system 700 may also include a volatile memory (e.g., a random access memory (RAM)) 720 to store executable instructions and information/data to be used by the executable instructions when executed by processing unit 710. Computer system 700 may still further include a non-volatile memory (e.g., a read only memory (ROM)) 730 to store instructions and static information for processing unit 710, and a mass storage device (e.g., a hard disk drive, a compact disc (CD) and associated CD drive, an optical disk and associated optical disk drive, a floppy disk and associated floppy disk drive, etc.) 740 that each may also be connected to bus 715 to enable each to have two-way communication across bus 715. In operation, embodiments of the present invention may be resident in processing unit 710 while being executed. For example, executing programmed instructions may cause processing unit 710 to be configured to perform the functions described herein. The computer system illustrated in FIG. 7 provides the basic features of a computer/server system that may be used in conjunction with embodiments of the present invention.

It is contemplated that embodiments of the present invention may also be used with computer/server systems that include additional elements not included in computer system 700 in FIG. 7. For example, these addition elements may include, but are not limited to, additional processing units (e.g., parallel processing units, graphics processing units, etc.), bridges and/or interfaces to a variety of peripherals (e.g., monitor, keyboard, mouse, printer, joystick, biometric devices, speakers, external communications devices (e.g., a LAN, a WAN, a modem, a router, etc.)).

Additionally, any configuration of the computer system in FIG. 7 may be used with the various embodiments of the present invention. The executable instructions (i.e., computer program) implementing the present invention may be stored in any memory or storage device accessible to processing unit 710, for example, but not limited to, volatile memory 720, mass storage device 740, or any other local or remotely connected memory or storage device.

Figure 8:
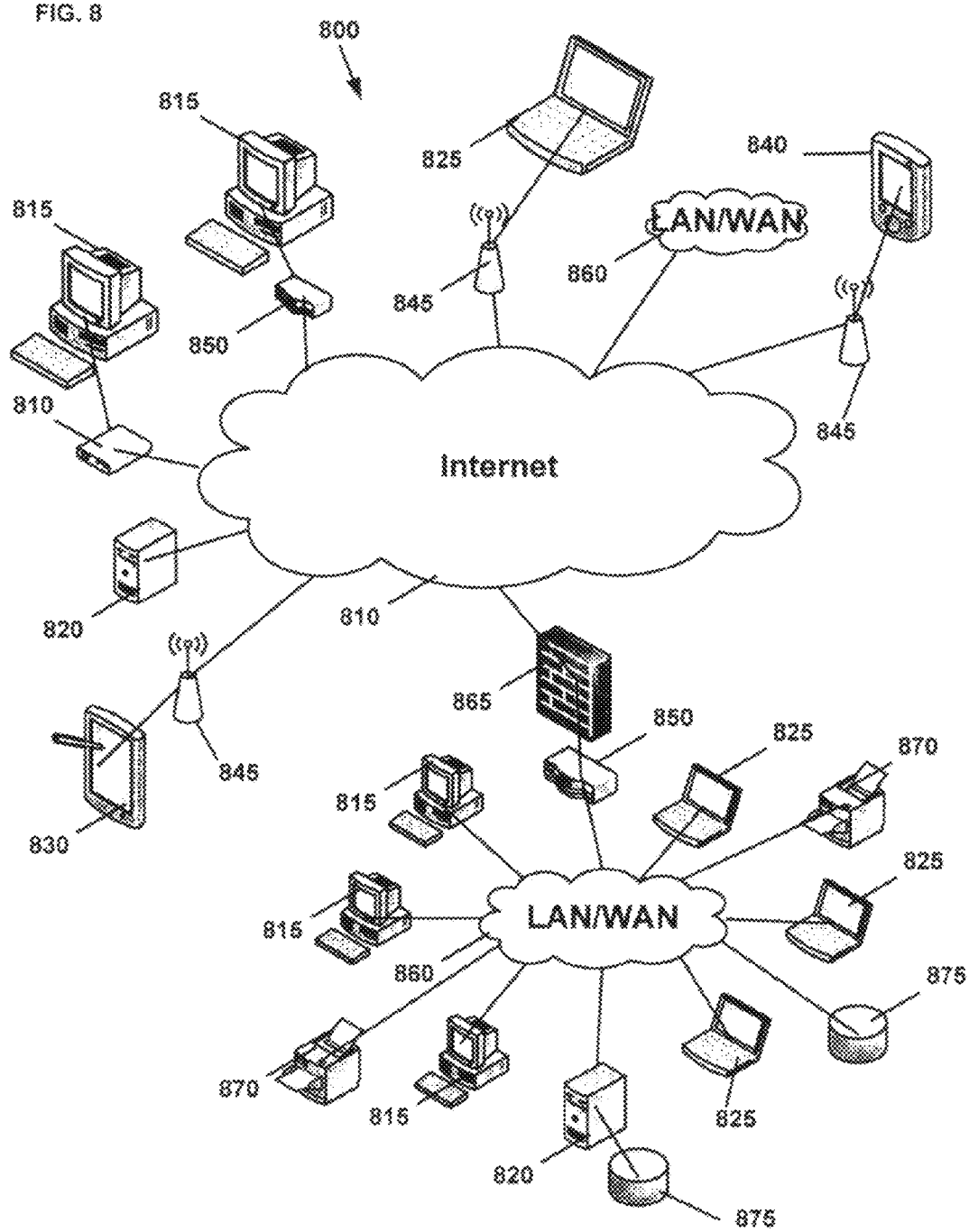
FIG. 8 is a diagram of a multiple network system that may be used in accordance with at least one embodiment of the present invention.

FIG. 8 is a diagram of a multiple network system that may be used in accordance with at least one embodiment of the present invention. In FIG. 8, Internet 810 has connected to it a variety of computers, servers and communications devices. For example, multiple desktop personal computers (PCs) 815, servers 820, lap top PCs 825, tablet PCs 830, and personal digital assistants (PDAs) 840 may be connected to Internet 810 via a variety of communications means. For example, the communications means may include wireless access points 845, such as seen connecting lap top PC 825, tablet PC 830, and PDA 840 to Internet 810; a router 850, as seen connecting a desktop PC to Internet 810; and a modem 855, as seen connecting another desktop PC to Internet 810. Internet 810 may also be connected to a LAN and/or WAN 860 via a firewall 865 and router 850. LAN and/or WAN 860 in turn may be directly connected to multiple desktop PCs 815, lap top PCs 825, multiple printers 870, one or more servers 820, and one or more mass storage devices 875, which may also be connected to one or more servers 820. Although the diagram in FIG. 8 is not exhaustive of all of the possible configurations and implementations, it is provided to illustrate a general network structure in which embodiments of the present invention may be implemented. Therefore, additional configurations and pieces of equipment are contemplated as being used with one or more embodiments of the present invention.

Thus, various embodiments provide one or more means for executing and performing an analysis of a networked 32/64-bit Microsoft computer's and/or server's internal communications configuration, configuring the computer to allow network management tool(s) to perform automated software updates on the networked 32/64-bit Microsoft PC and/or Server, but also insuring the security of the networked computer and/or server during the time of the automated software updates and during those periods that the networked computer and/or server is not receiving any automated software updates from the network management tool(s).

In accordance with one or more embodiments, each of the features of the present invention may be separately and independently claimed. Likewise, in accordance with one or more embodiments, each utility program, program, and/or code segment/module may be substituted for an equivalent means capable of substantially performing the same function(s).

In accordance with an embodiment of the present invention, a method may include reading a networked computer's software update policy, performing an analysis of the networked computer, monitoring all formal connections and enforcing the formal software update policy as defined by a software update policy file.

In accordance with an embodiment of the present invention, a method as substantially shown and described herein.

In accordance with another embodiment of the present invention, a system and method as substantially shown and described herein.

In accordance with yet another embodiment of the present invention, a computer and method as substantially shown and described herein.

In accordance with still another embodiment of the present invention, a network computer and method as substantially shown and described herein.

Although the present invention has been disclosed in detail, it should be understood that various changes, substitutions, and alterations can be made herein. Moreover, although software and hardware are described to control certain functions, such functions can be performed using either software, hardware or a combination of software and hardware, as is well known in the art. Other examples are readily ascertainable by one skilled in the art and can be made without departing from the spirit and scope of the present invention as defined by the following claims.

What is claimed is:

1. A method for protecting connections in a private access network from unauthorized connections from a public access network, the method comprising:

retrieving all media address codes (MAC) and Internet protocol (IP) addresses in a computer connected to a private access network;

performing an analysis of a communications configuration of the computer;

analyzing a plurality of shares in the computer including
establishing an interface to a network application programming interface (API) within the operating system;
checking for the existence of an administrative hard drive share and, if present, removing it from the computer;
checking for the existence of an administrative root folder share and, if present, removing it from the computer; and
obtaining an active shares list;

retrieving a software update policy for the computer;

configuring the computer for secure network communications and secure software updates using the communications connections policies;

allowing a network connection for an automated software update; if the network connection is from an approved policy for automated software updates; and terminating the network connection and logging the IP address of the terminated network connection, if the network connection is not from an approved policy for automated software updates.

2. The method of claim 1 wherein the retrieving all media address codes (MAC) and Internet protocol (IP) addresses in the computer comprises:

establishing a Winsock interface to an operating system in the computer;

establishing an Iphlapi interface to the operating system in the computer and reading an IP policy file; and establishing a PIP_ADAPTER_INFO table, filling a buffer with information associate with network adapters on the computer, and enumerating the network adapters in the table to retrieve all MAC codes and descriptions.

3. The method claim 1 wherein the performing an analysis of a communications configuration of the computer comprises:

capturing a TCP table and a UDP table.

4. The method of claim 3 wherein the analyzing all network shares in the computer comprises:

capturing a TCP table and a UDP table including
obtaining the TCP table and its entries; and
obtaining the UDP table and its entries.

5. The method of claim 1 wherein the removing each of the administrative shares from the computer comprises:

removing the administrative share from the computer using a NetShareDel( ) function.

6. The method of claim 1 wherein the obtaining an active shares list comprises:

obtaining an active shares list using a NetShareEnum( ) function.

7. The method of claim 1 wherein the retrieving a software update policy for the computer comprises:

retrieving the software update policy for the computer from a policy update data file.

8. The method of claim 1 wherein the configuring the computer for secure network communications and secure software updates using the communications connections policies comprises:
configuring the computer for secure network communications using the communications connections policies to prohibit network connections from a public access network and permit network connections from approved connections in the private access network.

9. The method of claim 8 wherein the configuring computer for secure network communications and secure software updates using the communications connections policies further comprises:
executing a parallel thread to monitor network shares in the computer; and
executing another parallel thread to monitor the TCP and UDP tables in the computer.

10. The method of claim 9 wherein the executing another parallel thread to monitor the TCP and UDP tables in the computer comprises:
retrieving the UDP table and entries and logging UDP communications to a data file;
retrieving the TCP table and entries and logging TCP communications to another data file;
if a TCP connection is not allowed by the communications connections policies, terminating the TCP connection and logging an associated event to said another data file; and
if the TCP connection is allowed by the communications connections policies, logging an associated event to said another data file.

11. A method for protecting connections in a private access network from unauthorized connections from a public access network, the method comprising:
retrieving all media address codes (MAC) and Internet protocol (IP) addresses in a computer connected to a private access network;
performing an analysis of a communications configuration of the computer;
analyzing a plurality of shares in the computer including;
retrieving a software update policy for the computer;
configuring the computer for secure network communications using the communications connections policies to prohibit network connections from a public access network and permit network connections from approved connections in the private access network;
executing a parallel thread to monitor network shares in the computer;
establishing an interface to a NetAPI within an operating system of the computer,
checking for the existence of an administrative hard drive share and, if present, removing it,
checking for the existence of an administrative root folder share and, if present, removing it, and
obtaining an active shares list,
starting another parallel thread to monitor network shares, and, if a new network share has been created, deleting the new network share according to the communications connections policies, and
continuing to monitor the network shares;
executing another parallel thread to monitor the TCP and UDP tables in the computer;
allowing a network connection for an automated software update, if the network connection is from an approved policy for automated software updates; and
terminating the network connection and logging the IP address of the terminated network connection, if the network connection is not from an approved policy for automated software updates.

12. A non-transitory machine-readable storage medium having stored thereon a plurality of executable instructions to perform a method for protecting connections in a private access network from unauthorized connections from a public access network, the method comprising:
retrieving all media address codes (MAC) and Internet protocol (IP) addresses in a computer connected to a private access network;
performing an analysis of a communications configuration of the computer;
analyzing a plurality of network shares in the computer including
establishing an interface to a network application programming interface (API) within the operating system;
checking for the existence of an administrative hard drive share and, if present, removing it from the computer;
checking for the existence of an administrative root folder share and, if present, removing it from the computer; and
obtaining an active shares list;
retrieving a software update policy for the computer;
configuring the computer for secure network communications and secure software updates using the communications connections policies;
allowing a network connection for an automated software update, if the network connection is from an approved policy for automated software updates; and
terminating the network connection and logging the IP address of the terminated network connection, if the network connection is not from an approved policy for automated software updates.

13. The machine-readable medium of claim 12 wherein the retrieving all media address codes (MAC) and Internet protocol (IP) addresses in the computer comprises:
establishing a Winsock interface to an operating system in the computer;
establishing an Iphlapi interface to the operating system in the computer and reading an IP policy file; and
establishing a PIP_ADAPTER_INFO table, filling a buffer with information associated with network adapters on the computer, and enumerating the network adapters in the table to retrieve all MAC codes and descriptions.

14. The machine-readable medium of claim 12 wherein the performing an analysis of a communications configuration of the computer comprises:
capturing a TCP table and a UDP table.

15. The machine-readable medium of claim 14 wherein the analyzing all network shares in the computer comprises:
capturing a TCP table and a UDP table including
obtaining the TCP table and its entries; and
obtaining the UDP table and its entries.

16. The machine-readable medium of claim 12 wherein the removing each of the administrative shares from the computer comprises:
removing the administrative share from the computer using a NetShareDel( ) function.

17. The machine-readable medium of claim 12 wherein the obtaining an active shares list comprises:
obtaining an active shares list using a NetShareEnum( ) function.

18. The machine-readable medium of claim 12 wherein the wherein the retrieving a software update policy for the computer comprises:
retrieving the software update policy for the computer from a policy update data file.

19. The machine-readable medium of claim 12 wherein the configuring the computer for secure network communications using the communications connections policies comprises:
configuring the computer for secure network communications using the communications connections policies to prohibit network connections from a public access network and permit network connections from approved connections in the private access network.

20. The machine-readable medium of claim 12 wherein the configuring the computer for secure network communications and secure software updates using the communications connections policies comprises:
executing a parallel thread to monitor network shares in the computer; and
executing another parallel thread to monitor the TCP and UDP tables in the computer.

21. The machine-readable medium of claim 20 wherein the executing another parallel thread to monitor the TCP and UDP tables in the computer comprises:
retrieving the UDP table and entries and logging UDP communications to a data file;
retrieving the TCP table and entries and logging TCP communications to another data file;
if a TCP connection is not allowed by the communications connections policies, terminating the TCP connection and logging the event to said another data file; and
if the TCP connection is allowed by the communications connections policies, logging the event to said another data file.

22. A non-transitory machine-readable storage medium having stored thereon a plurality of executable instructions to perform a method for protecting connections in a private access network from unauthorized connections from a public access network, the method comprising:
retrieving all media address codes (MAC) and Internet protocol (IP) address in a computer connected to a private access network;
performing an analysis of a communications configuration of the computer;
analyzing a plurality of network shares in the computer including
retrieving a software update policy for the computer;
configuring the computer for secure network communications and secure software updates using the communications connections policies;
executing a parallel thread to monitor network shares in the computer including
establishing an interface to a NetAPI within an operating system of the computer,
checking for the existence of an administrative hard drive share and, if present, removing it,
checking for the existence of an administrative root folder share and, if present, removing it, and
obtaining an active shares list,
starting another parallel thread to monitor network shares, and, if a new network share has been created, deleting the new network share according to the communications connections policies, and
continuing to monitor the network shares;
executing another parallel thread to monitor the TCP and UDP tables in the computer;
allowing a network connection for an automated software update, if the network connection is from an approved policy for automated software updates; and
terminating the network connection and logging the IP address of the terminated network connection, if the network connection is not from an approved policy for automated software updates.

23. An apparatus comprising a computer system including a processing unit and a volatile memory, the computer system including:
mean for retrieving all media address codes (MAC) and Internet protocol (IP) addresses in the computer system in a private access network;
means for performing an analysis of a communications configuration of the computer system;
means for analyzing a plurality of network shares in the computer system including
means for establishing an interface to a network application programming interface (API) within the operating system of the computer system;
means for checking for the existence of an administrative hard drive share and, if present, removing it from the computer system;
means for checking for the existence of an administrative root folder share and, if present, removing it from the computer system; and
means for obtaining an active shares list from the computer system;
means for retrieving a software update policy for the computer;
means for configuring the computer for secure network communications and secure software updates using the communications connections policies;
means for allowing a network connection for an automated software update, if the network connection is from an approved policy for automated software updates; and
means for terminating the network connection and logging the IP address of the terminated network connection, if the network connection is not from an approved policy for automated software updates.

24. The apparatus of claim 23 wherein the means for retrieving all media address codes (MAC) and Internet protocol (IP) addresses in the computer system comprises:
means for establishing a Winsock interface to an operating system in the computer system;
means for establishing an Iphlapi interface to the operating system in the computer system and reading an IP policy file; and
means for establishing a PIP_ADAPTER_INFO table, filling a buffer with information associated with network adapters on the computer system, and enumerating the network adapters in the table to retrieve all MAC codes and descriptions for the computer system.

25. The apparatus of claim 23 wherein the means for performing an analysis of a communications configuration of the computer system comprises:
means for capturing a TCP table and a UDP table in the computer system.

26. The apparatus of claim 25 wherein the means for analyzing all network shares in the computer system comprises:
means for capturing a TCP table and a UDP table in the computer system including
obtaining the TCP table and its entries; and
obtaining the UDP table and its entries.

27. The apparatus of claim 23 wherein the removing each of the administrative shares from the computer system comprises:
  removing the administrative share from the computer system using a NetShareDel( ) function.

28. The apparatus of claim 23 wherein the means for obtaining an active shares list from the computer system comprises:
  obtaining an active shares list from the computer system using a NetShareEnum( ) function.

29. The apparatus of claim 23 wherein the retrieving a software update policy for the computer comprises:
  retrieving the software update policy for the computer from a policy update data file.

30. The apparatus of claim 23 wherein the means for configuring the computer system for secure network communications using the communications connections policies comprises:
  means for configuring the computer system for secure network communications using the communications connections policies to prohibit network connections to the computer system from a public access network and to permit network connections to the computer system from approved connections in the private access network.

31. The apparatus of claim 30 wherein the means for configuring the computer for secure network communications and secure software updates using the communications connections policies comprises:
  means for executing a parallel thread to monitor network shares in the computer system; and
  means for executing another parallel thread to monitor the TCP and UDP tables in the computer system.

32. The apparatus of claim 31 wherein the means for executing the another parallel thread to monitor the TCP and UDP tables in the computer comprises:
  retrieving the UDP table and entries and logging UDP communications to a data file on the computer system;
  retrieving the TCP table and entries and logging TCP communications to another data file on the computer system;
  if a TCP connection is not allowed by the communications connections policies, terminating the TCP connection and logging the event to said another data file; and
  if the TCP connection is allowed by the communications connections policies, logging the event to said another data file.

33. An apparatus comprising a computer system including a processing unit and a volatile memory, the computer system including:
  means for retrieving all media address codes (MAC) and Internet protocol (IP) addresses in the computer system in a private access network;
  means for performing an analysis of a communications configuration of the computer system;
  means for analyzing a plurality of network shares in the computer system including
    means for retrieving a software update policy for the computer;
    means for configuring the computer for secure network communications and secure software updates using the communications connections policies;
  means for executing a parallel thread to monitor network shares in the computer system including
    establishing an interface to a NetAPI within the operating system of the computer system,
    checking for the existence of an administrative hard drive share on the computer system and, if present, removing it,
    checking for the existence of an administrative root folder share on the computer system and, if present, removing it,
    obtaining an active shares list from the computer system,
    starting another parallel thread to monitor network shares in the computer system, and, if a new network share has been created, deleting the new network share from the computer system according to the communications connections policies, and
    continuing to monitor the network shares in the computer system;
  means for executing another parallel thread to monitor the TCP and UDP tables in the computer system;
  means for allowing a network connection for an automated software update, if the network connection is from an approved policy for automated software updates; and
  means for terminating the network connection and logging the IP address of the terminated network connection, if the network connection is not from an approved policy for automated software updates.

* * * * *